US006629732B1

(12) United States Patent
Ursel et al.

(10) Patent No.: US 6,629,732 B1
(45) Date of Patent: Oct. 7, 2003

(54) LOAD COMPENSATING DEVICE FOR ADJUSTING A SEAT REST

(75) Inventors: Eckard Ursel, Buehl (DE); Gerhard Genter, Achern (DE); Manfred Winter, Lichtenau (DE); Walter Haussecker, Buehlertal (DE); Herbert Schiller, Buehlertal (DE); Erik Maennle, Oberkirch (DE); Guenter Hartz, Buehlertal (DE); Joerg Wolf, Karlsruhe (DE); Werner Prohaska, Ottersweier (DE); Martin Steuer, Buehlertal (DE); Hansjuergen Linde, Coburg (DE); Uwe Neumann, Bamberg (DE); Andreas Rehklau, Coburg (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 09/869,751

(22) PCT Filed: Oct. 19, 2000

(86) PCT No.: PCT/DE00/03672

§ 371 (c)(1),
(2), (4) Date: Jan. 9, 2002

(87) PCT Pub. No.: WO01/32462

PCT Pub. Date: May 10, 2001

(30) Foreign Application Priority Data

Nov. 3, 1999 (DE) .......................................... 199 52 963

(51) Int. Cl.$^7$ .............................................. B60N 2/225
(52) U.S. Cl. .................................. 297/362.11; 297/362

(58) Field of Search .............................. 297/362, 362.11, 297/367, 362.12, 361.1

(56) References Cited

U.S. PATENT DOCUMENTS

| | | | | |
|---|---|---|---|---|
| 3,051,526 A | * | 8/1962 | Werner et al. | 297/367 |
| 3,926,474 A | * | 12/1975 | Johndrow et al. | 297/354.12 |
| 4,402,547 A | * | 9/1983 | Weston et al. | 297/378.11 |
| 4,538,855 A | * | 9/1985 | Peetz et al. | 297/362 |
| 4,629,252 A | * | 12/1986 | Myers et al. | 297/366 |
| 4,836,606 A | * | 6/1989 | Werner | 297/362 |
| 5,547,254 A | * | 8/1996 | Hoshihara | 297/367 |
| 5,749,624 A | * | 5/1998 | Yoshida | 297/367 |
| 6,331,034 B1 | * | 12/2001 | Specht | 297/362.11 |

FOREIGN PATENT DOCUMENTS

| | | |
|---|---|---|
| DE | 39 00 219 A | 7/1989 |
| DE | 196 48 974 A | 5/1997 |
| EP | 0 099 414 A | 2/1984 |
| FR | 2 677 935 A | 12/1992 |

* cited by examiner

Primary Examiner—Peter R. Brown
(74) Attorney, Agent, or Firm—Michael J. Striker

(57) ABSTRACT

The invention relates to a device for adjusting a seat back (6) of a vehicle seat (4), in which a drive (9) that carries out adjusting processes is integrated. This acts on stagger gears (10, 22), with which the seat back (6) is moved within a range of inclination (13). A torsion element (24) is provided between the stagger gears (10, 22) that compensates the clearance in the stagger gears (10, 22) within a first range of adjustment (18) of the seat back (6) and functions as support for the driver motor within a further range of adjustment (19) of the seat back (6).

8 Claims, 3 Drawing Sheets

LOAD COMPENSATING DEVICE FOR ADJUSTING A SEAT REST

BACKGROUND OF THE INVENTION

To an increasing extent, vehicle seats are provided with electric actuators in order to provide the vehicle passengers with ergonomic and comfortable seating in the vehicle and to make it possible for the passengers to adjust the respective seat position individually. The seat back is usually adjusted by way of stagger gears integrated in the seat back fittings.

In the electric seat back adjustments known previously, the adjusting gears are driven by way of electric motors that act on stagger gears. While, with electric positioning driver motors, the positioning of the seat takes place in a horizontally oriented plane and the course of torque and force changes continuously, a seat back adjustment on a vehicle seat is associated with a discontinuous course of torque. The upper torso weight of the person who is adjusting the seat back acts on the seat back to be adjusted and, depending on the degree of inclination of the seat back, creates a discontinuous course of torque for the driver motor on the drive end, especially when loaded. Depending on the adjustment position of the seat back, this makes itself felt as an irregular motor speed on the one hand, and, on the other, as an irregular set of noises produced by the driver motor.

SUMMARY OF THE INVENTION

With the selected installation position of the torsion element, this can be used on the one hand to compensate clearance within the stagger gears that adjust the seat back on both sides of the seat area; on the other hand, a preloading of the torsion element is possible by way of the downward motion of the seat back. If the seat back is now moved upward again in the direction of the vertical line, the torsion spring—as an energy accumulator—supports the upward motion of the seat back by the driver motor by way of its release of tension.

It is especially advantageous to design a transmission shaft that connects the two stagger gears as a hollow shaft that can enclose the torsion element. The greater the inner diameter that can be used for the hollow shaft, the stronger the torsion elements can be, as based on their diameter. The greater the diameter that can be used for the torsion bars used as torsion elements, for instance, the greater the supportive effect of the torsion elements are for the drive during the upward motion of the loaded seat back.

Using the solution proposed according to the invention, the clearance in the stagger gears that carry out the adjusting motion of the seat back can be compensated. This makes a continuous adjusting motion possible that proceeds uniformly and without jerking, without the seat back having to be relieved of its load. A square neck of the torsion element can be embedded with positive engagement in an abutment that encloses the square neck to safeguard the torsion bar, which extends through the transmission shaft between the stagger gears, against twisting. To save space, the torsion element can be installed inside a transmission shaft between the stagger gears designed as a hollow shaft; the configuration of the seat back fittings and the bearings of the stagger gears requires no modification; using the modular principle, identical parts can be used to the greatest extent.

BRIEF DESCRIPTION OF THE DRAWINGS

The invention is described in greater detail below using the drawings.

DESCRIPTION OF PREFERRED EMBODIMENTS

Figure 1:
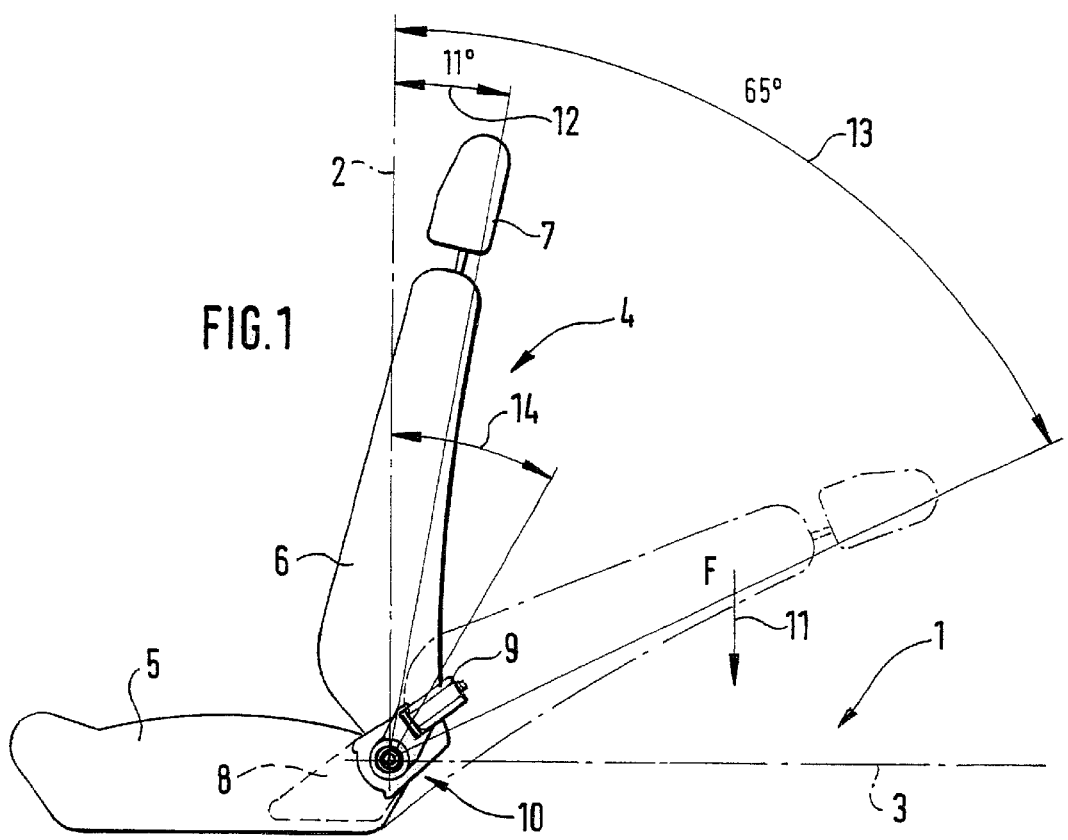
FIG. 1 shows the ranges of adjustment of a seat back that can be actuated using an electric driver motor.

FIG. 1 shows the ranges of adjustment of a seat back of an electrically actuatable vehicle seat.

The ranges of inclination of a seat back 6 can be limited using a reference system 1 that includes a vertical line 2 and a horizontal line 3. In the normal state, the seat back 6 of a vehicle seat 4 is inclined by approximately 11°, as indicated by reference number 12. In current vehicle seats 4, a head rest 7 is provided on the upper section of the seat back 6 that can be slid in a vertical direction depending on the height of the vehicle passenger. On the sides of a seat area 5 of the vehicle seat 4, opposing fittings 8 are provided on both sides of the seat that accommodate the seat back 6 which can be inclined relative to the seat area 5 and can hide its actuators 9, 10. An electric motor—as the actuator—for example, can be integrated inside the vehicle seat 4, which acts on a stagger gear 10 which adjusts the seat back 6 in various positions of inclination in relation to the vertical line 2.

The normal position of the seat back 6 in relation to the vertical line 2 is indicated by reference number 12 and is a seat back inclination of approximately 10° in relation to the vertical line 2, 11° in the design example. The maximum angle of inclination of the seat back 6 in relation to the vertical line 2 indicated as 65° in the design example can be designed to be larger or smaller, depending on the arrangement of the seat bench or the individual seats in the rear compartment of a vehicle. The installation position of a torsion element 24 (see FIG. 4) is indicated by reference number 14; it is installed twisted at an angle of approximately 300 in relation to the vertical line 2.

The load is indicated by reference number 11. It acts on the seat back 6 and corresponds to the weight of the upper torso of the vehicle passenger. It acts on the drive 9, which adjusts the seat back 6 with an irregular—corresponding to the upward motion of the seat back 6 proceeding torque.

Figure 2:
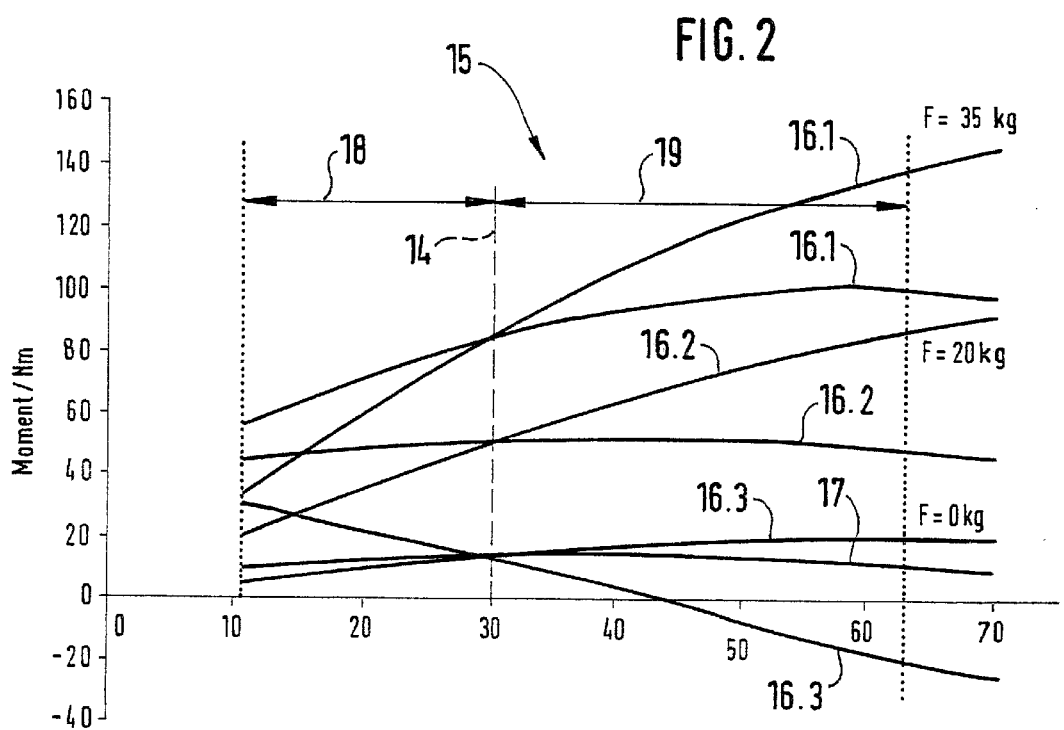
FIG. 2 shows the courses of torque for the different load situations plotted against the angle of the seat back.

Courses of torque are shown in FIG. 2, which correspond to various load states plotted against the angle of inclination of the seat back 6.

In the case of the course of the characteristic curve 16.1, a load 11 (F=35 kg) is applied to the seat back 6. According to the pair of characteristic lines 16.1—the top one of which reflects the course of the torque and the bottom one of which reflects the diameter of the corresponding torsion element 24—two ranges are defined on both sides of the 30° angle mark for the angle of inclination of the seat back. The two ranges 18 and 19 extend on both sides of the installation position 14, which reflects the installed position of the torsion element 24, which is twisted by 30°. Within the first range of adjustment 18, which extends from the 10° angle of seat back inclination to the 30° angle mark of the installation position 14, the torsion element 24 preloaded in this range squeezes out the clearance of the toothing resulting from manufacturing tolerances inside the stagger gear 10 so that they can be adjusted without clearance. This is possible due to the installation position 14 of the torsion element 24, which is twisted by 30° in relation to the vertical line 2.

In the range extending between the 30° angle mark and the end of the further angle of adjustment 19 to the approximately 65° angle of seat back inclination, the torsion element 24 serves to support the actuator 9 (see FIG. 1). When the seat back 6 is inclined to the position of 65° inclination, the torsion element 24 proposed according to the invention undergoes preloading by twisting and supports the drive 9 of the set back 6 in the subsequent motion of the seat back 6 back up to its normal position 12 by the stepwise restoration of the preloaded state.

The courses of the characteristic curves 16.2 and 16.3 for moderate and low loads, respectively, which are also shown in FIG. 2, behave analogously to the course of the curve 16.1. Based on the installation position 14 of the torsion element 24, characterized by the position of 30° inclination of the seat back, the preload range 19 extends between the 10° and the 30° seat back inclination mark, while the further range of adjustment 19, which supports the driver motor 9 during upward motion of the seat back 6, extends between the 30° and the 65° angle mark according to FIG. 2. Each of the bottom characteristic lines of the courses of the characteristic curves 16.1, 16.2, and 16.3 represent the courses of torque for torsion elements having a diameter of 8 mm. The characteristic line of a torsion element 24 is indicated by the course of the characteristic line 17, which. has a smaller diameter, approximately 6 mm as compared with 8 mm, corresponding to the courses of the characteristic lines 16.1, 16.2, and 16.3.

Figure 3:
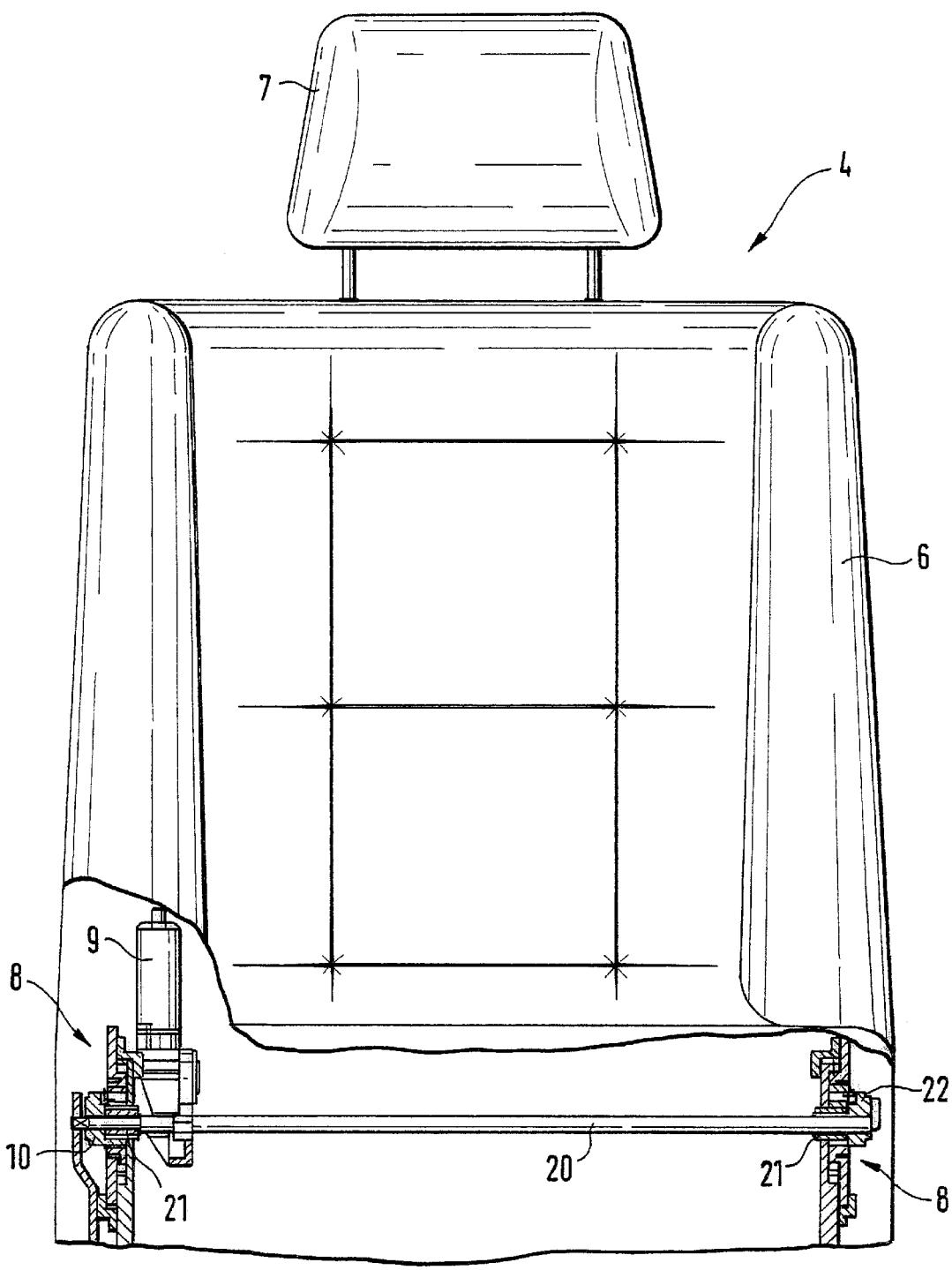
FIG. 3 shows the front view of a vehicle seat with a transmission shaft that extends between the stagger gears.

FIG. 3 shows the front view of a vehicle seat having a transmission shaft which extends between the stagger gears.

The actuator 9 and the transmission shaft 20 that connects the two stagger gears 10, 22 with each other are located inside the vehicle seat 4. Each of the stagger gears 10, 22 is located on the sides of the seat area of the vehicle seat 4. The transmission shaft 20 can be designed preferably as a hollow shaft with the greatest possible inner diameter 30. Depending on the size of the inner diameter 30 of the transmission shaft 20, larger torsion bars 24—as the torsion elements—can be installed in the hollow shaft. The stagger gears 10, 22, which connect the seat back 6 with the lateral fittings 8, are connected with each other by way of the hollow shaft 20; only one of the stagger gears 10, 22 on one side of the vehicle seat 4 is assigned to an electric motor drive 9. Shaft bearings 21 are provided on each of the fittings 8, which accommodate the transmission shaft 20 in a rotatable manner.

Figure 4:
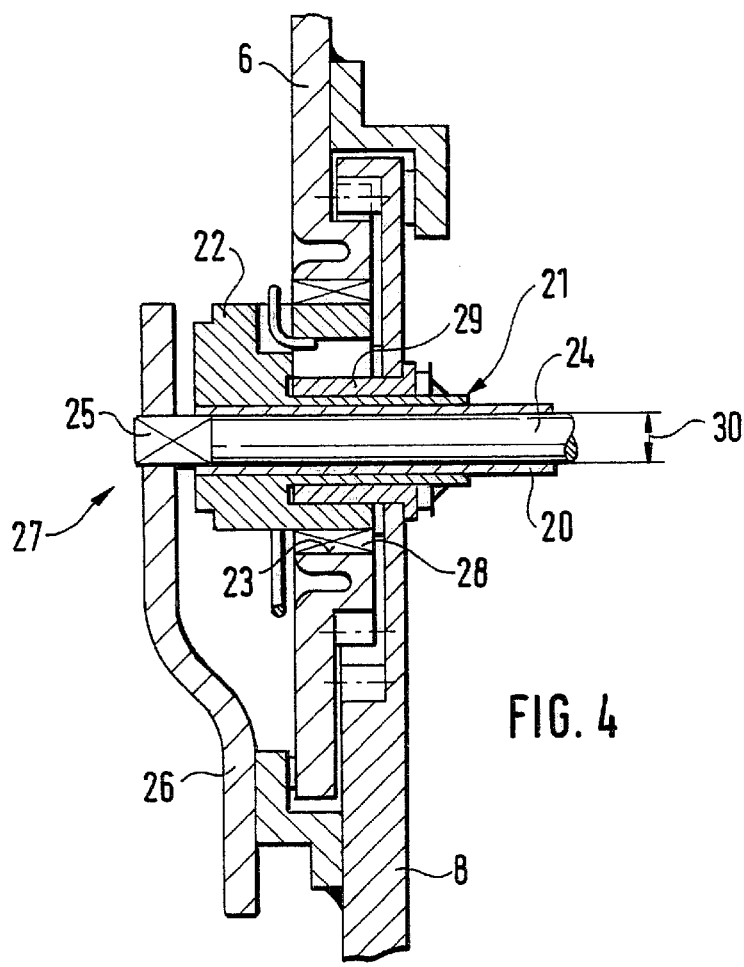
FIG. 4 shows the abutment of a torsion element that extends through a hollow shaft.

FIG. 4 shows the arrangement of one of the stagger drives on one side of the vehicle seat.

The transmission shaft 20 designed as a hollow shaft accommodates a torsion element 24 sized in accordance its inner diameter 30. The torsion element 24 is provided with a square neck 25 that acts as an abutment. Instead of a square neck 25, which is shown here, other abutments such as multispline profiles are feasible as abutment designs that bring about positive engagement. In the design example shown in FIG. 4, one end of the torsion bar 24 is designed as a square neck 25 and is enclosed by an abutment 26, whereby the torsion element 24 is fixed in its position. The position of the torsion element 24 corresponds to its previously-mentioned installation position 14, which is twisted by 30° in relation to the vertical line 2. One end of the abutment 26 is connected with the fitting 8 for torque support, for instance. The abutment 26 functions as a torsion safeguard 27 for the torsion element 24 which extends through the transmission shaft 20.

The transmission shaft 20 designed as a hollow shaft is enclosed by a sleeve 29, which is accommodated in the fitting 8. A stagger gear 22 is located on the outside of this transmission shaft 20, which is accommodated in antifriction bearings 28 in the bore 23 of the adjustable seat back 6 and allows a relative adjustment between the fitting 8 and the seat back 6. In addition to the torsional safeguard 27 shown, other torsional safeguards are also feasible, of course, with which the torsion element 24 that extends through the hollow shaft 20 can be held in its installation position 14, twisted by 30° in relation to the vertical line 2. The embodiment shown is to be regarded as an example of many possible variants.

Figure 5:
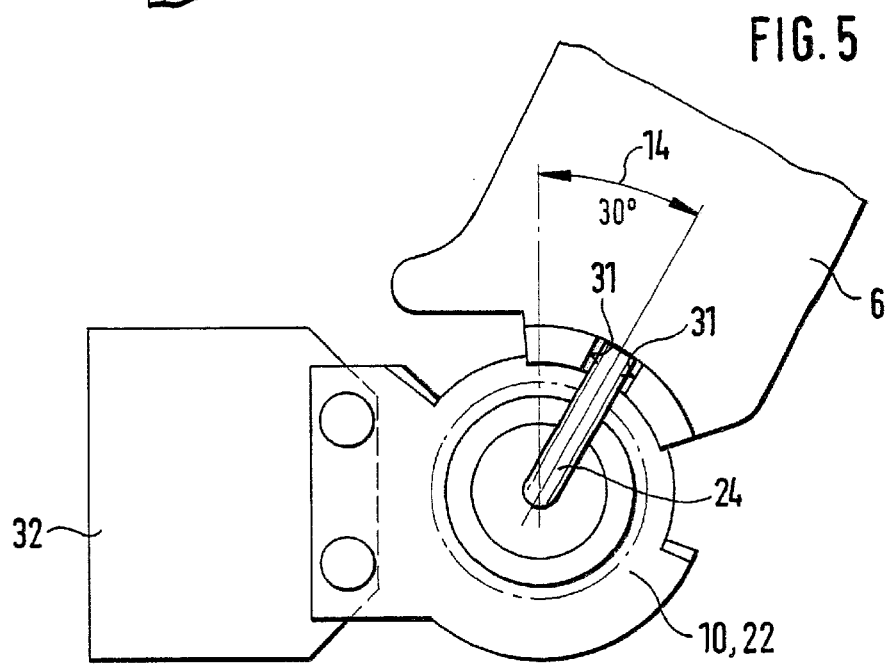
FIG. 5 shows the side view of a vehicle seat fitting in the area of the seat back.

Finally, FIG. 5 shows the connection area of the seat back 6 which can be adjusted in relation to the body 22 of the vehicle seat 4.

The installation position 14 of an L-shaped torsion bar serving as a torsion element 24 can be determined, for instance, in that the angled end of the torsion element 24 between two stops 31 on the seat back 6 of a vehicle seat 4 is specified in an angle of approximately 30°. This allows the exact twisting position of the rod-shaped torsion element 24 on one side of the vehicle seat 4 to be indicated, while the torsion element 24 on the opposite side of the vehicle seat 4 is safeguarded against twisting. The larger the torsion elements 24 can be designed, the greater the support they can provide for the drive 9 as a seat back 6 moved downward is moved upward, and a set of noises produced by the driver motor 9 that is that much more regular is achieved.

REFERENCE NUMBERS

1 Reference System
2 Vertical line
3 Horizontal line
4 Vehicle seat
5 Seat area
6 Seat back
7 Headrest
8 Fitting
19 Drivermotor
10 Stagger gear
11 Load
12 Normal inclination
13 Maximum range of inclination
14 Installation position
15 Course of torque and angle of inclination
16.1 High load
16.2 Moderate load
16.3 Low load
17 Diameter of spring element
18 Preload range
19 Support range
20 Hollow shaft
21 Shaft bearing
22 Stagger gear
23 Bore
24 Torsion bar
25 Square neck
26 Abutment
27 Torsion safeguard
28 Stagger gear bearing
29 Sleeve
30 Inner diameter of hollow shaft
31 Stop
32 Body

What is claimed is:

1. Device for adjusting a seatback (6) of a vehicle seat (4), comprising a drive motor (9) that carries out adjusting processes stagger gears (10, 22) acted on by the drive motor and connectable to the seatback to move the seat back (6) within a range of inclination (13), a torsion element (24) provided in a rotation point of the stagger gears (10, 22) that compensates a clearance in the stagger gears (10, 22) resulted from manufacturing tolerances and also functions as support for the driver motor (9).

2. Device according to claim 1, wherein the torsion element (24) is unstressed in an installation position (14) in relation to the seat back (6).

3. Device according to claim 2, wherein the torsion element (24), in its installation position (14), is oriented at approximately 30° in relation to a vertical line (2) and is unstressed.

4. Device according to claim 2, wherein in the installation position (14), an L-shaped extension of the torsion element (24) is enclosed by two stops (31) on the seat back (6).

5. Device according to claim 1, wherein the torsion element (24) is enclosed by a hollow shaft (24) which connects the stagger gears (10, 22).

6. Device according to claim 1, wherein the torsion element (24) extends from an approximately 10° to an approximately 30° inclination of the seat back (6) in relation to a vertical line (2).

7. Device according to claim 1, characterized in that wherein the torsion element (24) extends from an approximately 30° to an approximately 65° inclination of the seat back (6) in relation to a vertical line (2).

8. Device according to claim 1, characterized in that a supportive effect of the torsion element (24) increases as the seat back (6) moves upwards.

* * * * *